United States Patent [19]

Allum et al.

[11] Patent Number: 5,420,403
[45] Date of Patent: May 30, 1995

[54] MAIL ENCODING AND PROCESSING SYSTEM

[75] Inventors: David R. Allum, Orleans; Frederick S. Johns, Nepean; Donald G. Clysdale, Ottawa, all of Canada

[73] Assignee: Canada Post Corporation, Ontario, Canada

[21] Appl. No.: 888,905

[22] Filed: May 26, 1992

[51] Int. Cl.⁶ .................. G06K 7/10; G06F 15/20
[52] U.S. Cl. .................... 235/375; 235/454; 235/378; 235/494; 364/478; 209/584
[58] Field of Search .............. 235/375, 378, 494, 384; 364/478, 464.02; 382/65, 67; 209/3.3, 584, 900, 551

[56] References Cited

U.S. PATENT DOCUMENTS

| | | | |
|---|---|---|---|
| 4,167,476 | 9/1979 | Jackson | 209/551 |
| 4,743,747 | 5/1988 | Fougere et al. | 235/375 |
| 4,752,675 | 6/1988 | Zetmeir | 235/375 |
| 4,871,903 | 10/1989 | Carrell | 235/375 |
| 4,992,649 | 2/1991 | Mampe et al. | 235/375 |
| 4,999,481 | 3/1991 | Baer et al. | 235/494 |
| 5,031,223 | 7/1991 | Rosenbaum et al. | 364/478 |
| 5,216,620 | 1/1993 | Sansone | 364/478 X |
| 5,249,687 | 10/1993 | Rosenbaum et al. | 209/3.3 X |

FOREIGN PATENT DOCUMENTS

| | | |
|---|---|---|
| 903109 | 6/1972 | Canada. |
| 989343 | 5/1976 | Canada. |
| 998963 | 10/1976 | Canada. |
| 1000386 | 11/1976 | Canada. |
| 1264341 | 9/1990 | Canada. |
| 1291247 | 10/1991 | Canada. |
| 0447581 | 9/1991 | European Pat. Off. ........ 209/900 |
| 2097330 | 11/1982 | United Kingdom .......... 209/584 |
| 2225999 | 6/1990 | United Kingdom .......... 209/584 |

Primary Examiner—Donald Hajec
Assistant Examiner—Esther Chin
Attorney, Agent, or Firm—Wenderoth, Lind & Ponack

[57] ABSTRACT

Mail can be sorted automatically to point of delivery level by deriving from the address including postal code on a piece of mail a suffix which together with the postal code forms routing data which uniquely identifies the final delivery address. This is achieved automatically at the Post office sorting facility by means of an optical character reader which reads the addresses on mail items and a computer arranged to generate a suffix based on the address read. The routing data is printed as a bar code on the mail item and this allows the complete sortation to be effected automatically. Also contemplated is a progressive encoding system which can be applied as bar codes by customers as desired to mail pieces. The basic data is the routing data set to which can be added a shipment number which allows automatic revenue accounting control and a piece number which allows automatic track and trace. Finally, the customer may also progressively encode return mail envelopes with the shipment number followed by a product code and a user defined field which permits automatic specialized handling of the return mail item.

6 Claims, 8 Drawing Sheets

FIG. 10

YYYYYYY  ZZ    FSA LDU XXXX
　└──┬──┘  └┬┘   └────┬────┘
     29      30         31

└──────────────────────────┘
SPECIAL SERVICES DATA SET 28

MAIL ENCODING AND PROCESSING SYSTEM

BACKGROUD OF THE INVENTION

This invention relates to a system for processing mail and, more particularly, to such a system which permits increased automation in activities such as sorting, account control and tracing.

Some years ago the postal code was introduced to facilitate automation in sorting. In Canada, the postal code contains six alpha-numeric characters. In some cases the customer converts this to a bar code which he applies to the envelope but more usually the bar code is generated automatically by processing apparatus at the Post Office. More particularly, the processing apparatus includes an optical character reader (O.C.R.) which reads the alpha-numeric code and, under control of a computer, causes the bar code to be applied in fluorescent ink to a reserved zone near the bottom edge of the envelope. Subsequently, the processing apparatus sorts the mail in accordance with the bar codes.

Usually, the mail passes through several automatic sorting levels to the final sorting level which is a manual one based not on the postal code but the street and number address which forms the basis of the delivery route by the mail delivery person.

The transformation of this final manual sorting level to an automatic process has proved difficult in practice.

Another area where automation would increase efficiency is revenue accounting. The largest revenue for the Post Office is generated by customers who send so many pieces of mail on a regular basis that the Post Office provides them with a special payment arrangement, rather than insist that each piece of mail carry a postage stamp. This arrangement relies upon the use of a manifest listing details of the mail shipment such as the number of pieces, product type, weight, unit rate, postage due. The customer's name and account number also appear on the manifest. If errors appear in the manifest they cannot easily be identified and so the amount billed by the Post Office might be based upon incorrect data.

Tracing of letters is at the present time not integrated into the main automated mail stream. Accordingly, there is no way of tracing with any certainty a regular piece of mail unless it is handled specially outside the main stream and this adds considerable expense. At the present time, if a customer wants to ensure that an important piece of mail can be traced, he can buy a coded label which is then affixed to the piece of mail. Although this system does work, it is inefficient particularly because it is outside the regular stream and involves the use of a completely separate code which is not related in any way to the customer.

SUMMARY OF THE INVENTION

It is accordingly an object of the present invention to provide a mail processing system which permits automated sortation of mail in delivery route sequence.

Another object is to automate the financial accounting of revenues.

A further object is to permit efficient tracing capability integrated with the main processing stream.

A final object is to provide further automation capability.

In one aspect, the present invention provides apparatus for automatically sorting mail in which feeding means supplies pieces of mail to an O.C.R. which reads the address including the postal code. The output from the O.C.R. is fed to a computer which is programmed to generate a stop identifier suffix which together with the postal code forms a point of delivery identifier (PODI) which uniquely identifies the final delivery address and can be bar coded onto the mail item for subsequent sorting control.

The stop identifier suffix is preferably formed as a bar code and the postal code is also converted into a bar code and the resulting PODI is printed on a space at the bottom of the piece of mail. This enables final route sequencing to be achieved using the automatic sorting machines.

The invention also contemplates the use of a progressive series of bar coded data sets which can be applied optionally by customers to designated areas of mail items.

The first bar coded data set of the series is a six character set comprising the postal code. Prior to the invention some customers have been applying this data set and this will therefore be referred to as the basic level or the level 1 service. The customer may add to this first data set the stop identifier suffix which forms with the postal code a routing data set, otherwise known as the PODI, which permits automated sortation to the delivery address. This provides level 2 service.

Level 3 service is accounting control which is achieved by the customer adding a customer shipment number to the level 2 code. This permits revenue accounting to be carried out automatically.

Level 4 service is a track and trace feature which is achieved simply by the customer adding a piece number to the level 3 code. This permits mail items to be tracked at any point in the sortation system.

Level 5 service is a special services data set which is to be applied by the customer to return mail items which the customer sends to an addressee. For example, the data field of a business reply mailing could include a promotional media identifier, a respondent identifier, a response type identifier or a sortation code for separating return mail. The level 5 service data set starts from the customer shipment number, (routing data is not required since all the mail pieces within the return shipment have the same routing data) and to this is added a customer defined field which could, for example, identify the respondent.

This five level coding system permits single stream processing of mail while permitting routing and various optional services to be selected by the customer.

As indicated above, the postal code used in Canada contains six alpha-numeric characters but the inventive principles obviously are not restricted to this type of postal code.

BRIEF DESCRIPTION OF THE DRAWINGS

FIG. 10 illustrates special services data which can be applied by a customer to return mail;

DESCRIPTION OF PREFERRED EMBODIMENT

Figure 1:
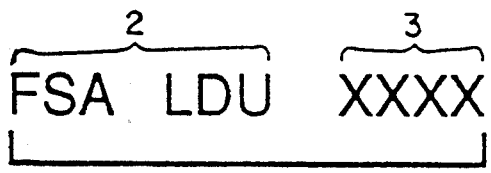
FIG. 1 illustrates the routing data set which will permit automated sortation to the delivery address.

FIG. 1 illustrates the routing data set or PODI which can be applied by a customer or which can be generated at the Post Office from the address on a piece of mail. The PODI 1 comprises the conventional six character alpha-numeric postal code 2 followed by four alpha-numeric characters known as a stop identifier suffix 3. The first three characters of the postal code designate the Forward Sortation Area, abbreviated to FSA and the second three characters of the postal code designate the Local Delivery Unit, abbreviated to LDU.

The derivation of the stop identifier suffix and thus the PODI is achieved by means of algorithms which consider the total address including the postal code. So that the customer himself can apply the PODI, the Post Office would either provide the customer with the PODIs that match his address list or with the algorithms necessary to generate from the address list the PODIs. In either case the routing data set is converted to a bar code before application by the customer.

If the customer does not apply the routing data set but has fully addressed a piece of mail the Post Office will generate the PODI from the address and apply the PODI in bar code format to the piece of mail.

Figure 6:
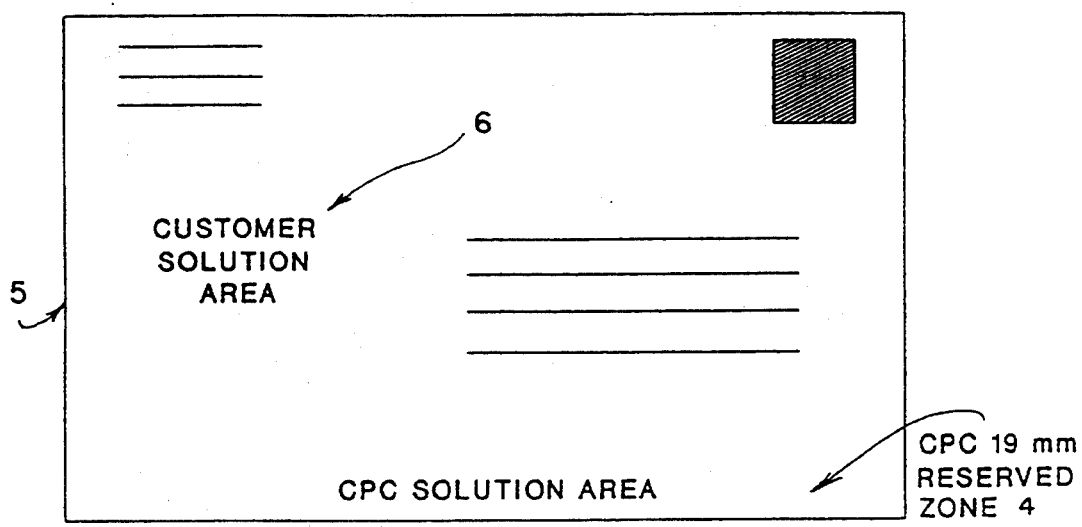
FIG. 6 is a plan view of an envelope showing the areas reserved for customer applied bar codes and Post Office applied bar codes.
Figure 8:
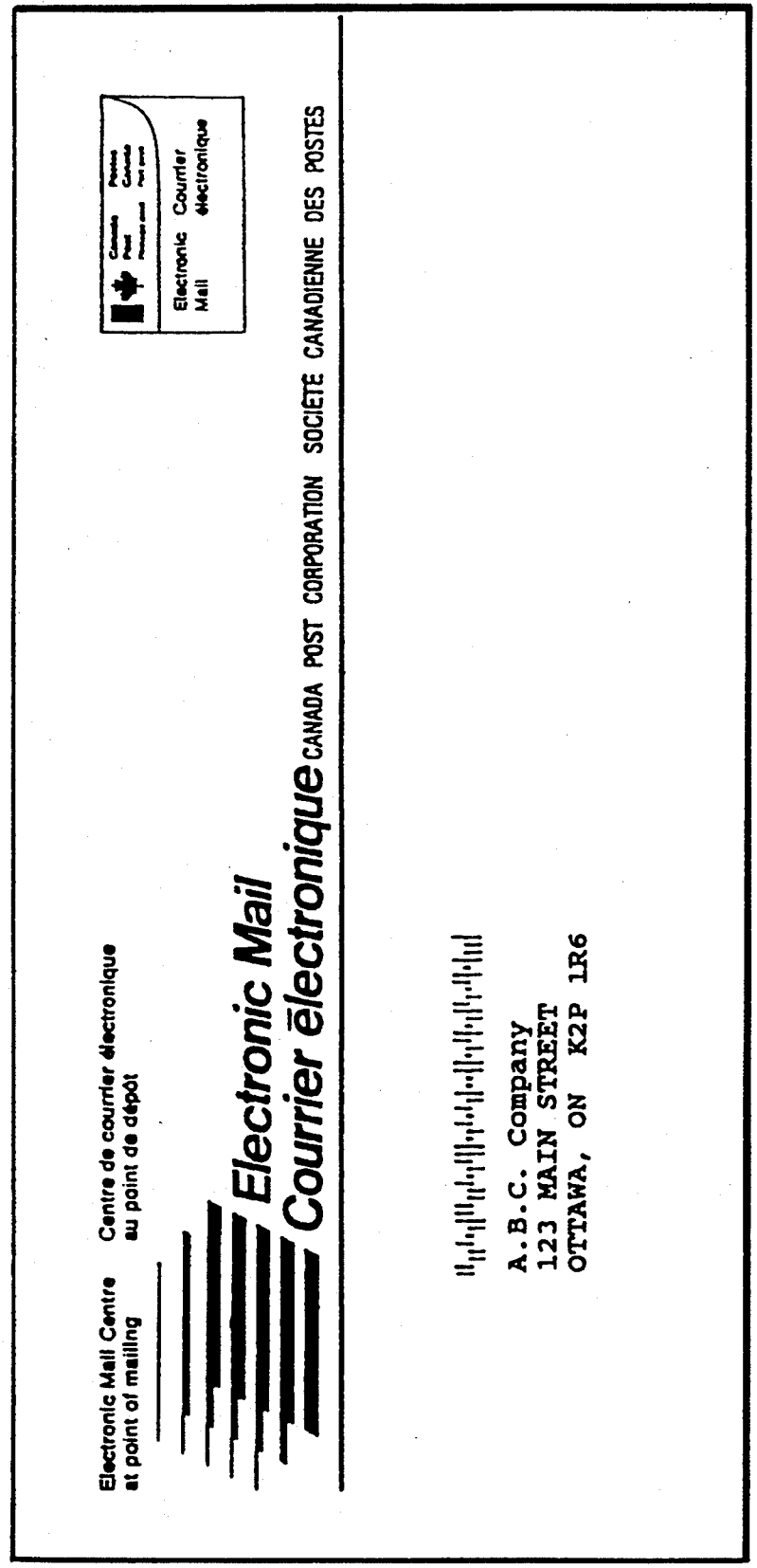
FIG. 8 is a plan view of an envelope showing a typical bar code applied by a customer.

As illustrated in FIG. 6 the bar code generated by the Post Office is applied to a reserved zone 4 running along the bottom margin of the front face of an envelope 5 while any bar code applied by the customer must be limited to a zone 6 located above the zone 4 and below an upper margin where the postage stamp and return address are located. As seen in FIG. 8 the customer-applied bar code may be applied above the address to permit the use of window envelopes. Although not illustrated the customer-applied bar code could instead be applied immediately below the address (but above zone 4) the right of the address as seen in FIG. 9 or to the left of the address.

Figure 7:
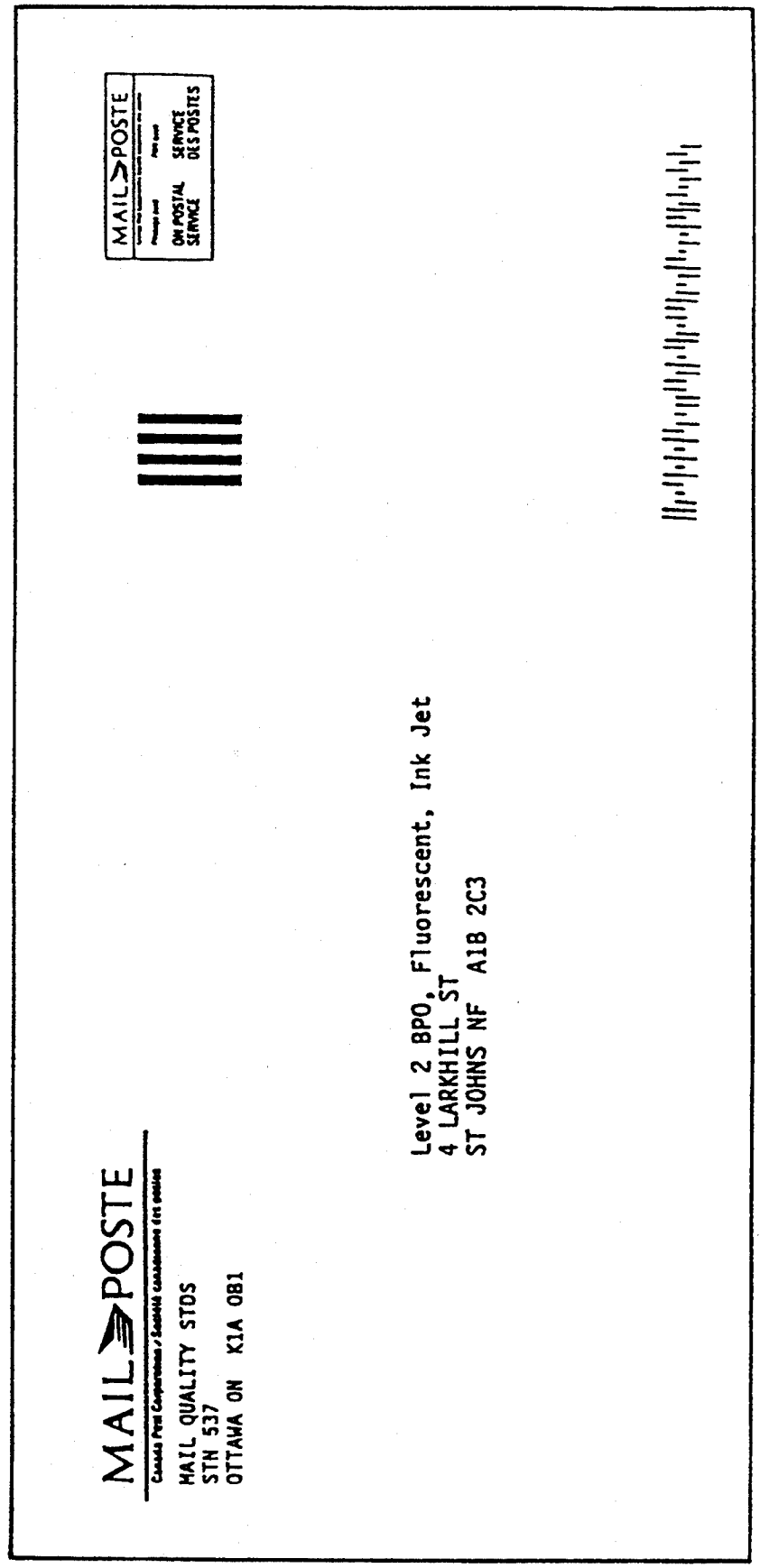
FIG. 7 is a plan view of an envelope showing a typical bar code applied by the Post Office.
Figure 9:
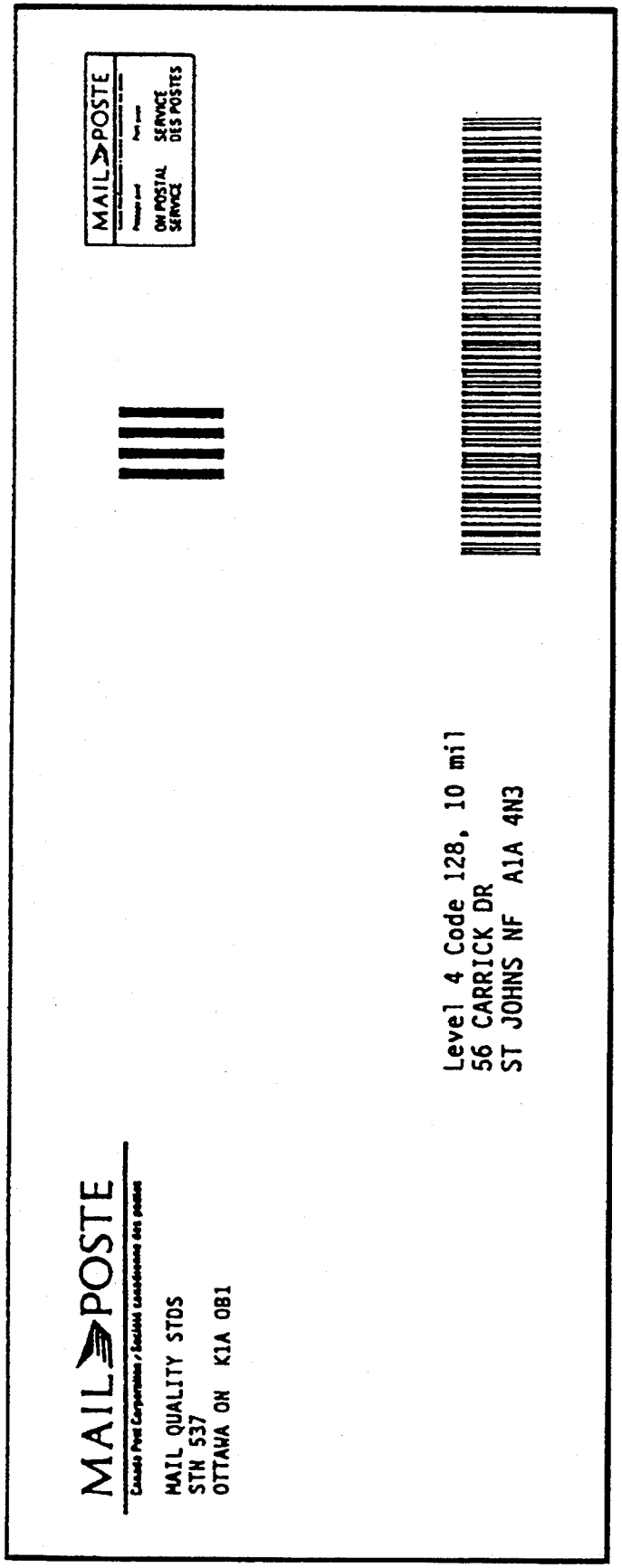
FIG. 9 illustrates another example of customer applied bar code.

As shown in FIGS. 8 and 9 the actual bar code used by the customer may vary. The bar code scanner 11 of FIG. 5 will be able to cope with several different bar codes. The bar code currently considered by the Canadian Post Office is a modified PostNet-type, 4-state code which improves upon the limited alphabetic capacity of the pure PostNet code while retaining the high-speed robust printing and reading capability which makes PostNet attractive. This modified PostNet code is the one illustrated in FIGS. 7 and 8. In the case of Post Office applied codes these will use the conventional fluorescent ink presently used in indicating the postal code in bar code format. The bar codes applied by the customer will be in the form of black print. FIG. 9 shows an example of standard 128 code used as the customer code.

Figure 5:
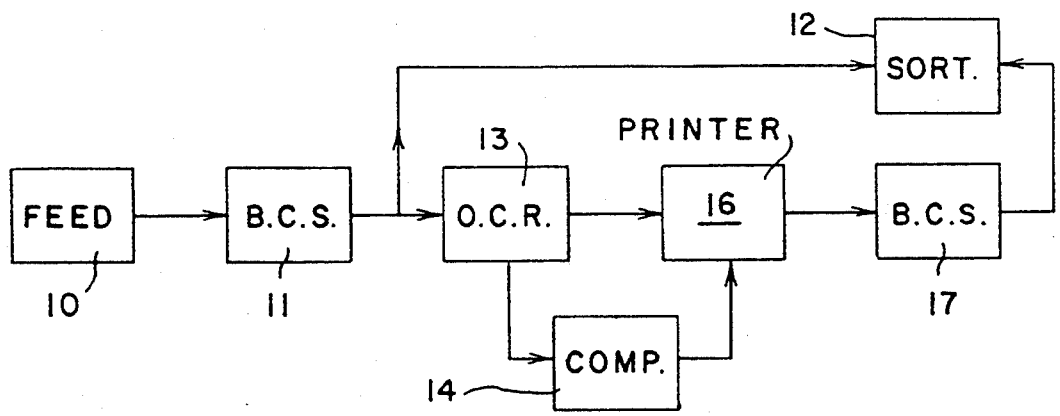
FIG. 5 is a block diagram illustrating hardware portions of an automatic sorting system.

Referring now to FIG. 5 which illustrates schematically a sorting system according to the invention, mail pieces are applied to a feeder 10 which carries the pieces sequentially under a wide area multi-font bar code scanner 11 which lifts an image of the entire envelope of each mail piece and lifts and decodes all bar codes. If the mail pieces contain routing data (PODI) in suitable bar code format the scanner 11 reads the routing data and passes the mail pieces to sorter 12 where the pieces are sorted according to their routing data. Actually the sorting process, symbolically illustrated in a single block 12, might involve several sorting stages but, in any event, the presence of the PODI permits automatic sorting down to delivery route sequencing.

If the mail pieces do not contain a PODI, they are passed through an O.C.R. 13 which includes a scanning stage which lifts an image of the entire envelope of each mail piece. The O.C.R. then reads the address and postal code and generates an output to a computer 14. The computer is programmed to derive a stop identifier suffix from the complete address and convert the postal code and stop identifier suffix into a bar coded version of the routing data set or PODI of FIG. 1. The computer in turn instructs a printer 16 to print the bar code in fluorescent ink onto zone 4 of the envelopes. The mail pieces are then read by a singe array bar code scanner 17 to verify proper bar code printing and then passed to the sorter 12 as described previously.

Figure 2:
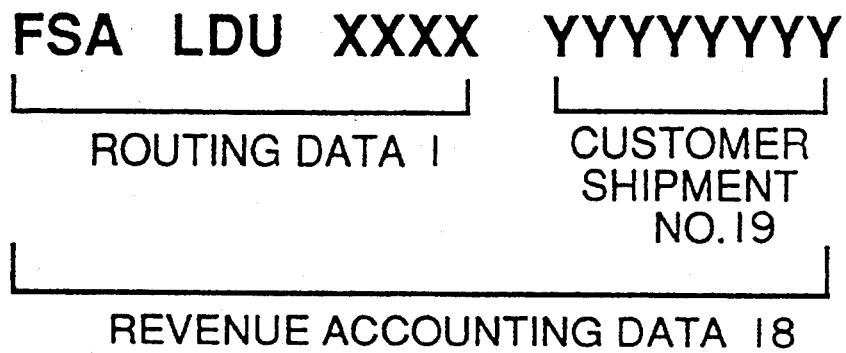
FIG. 2 illustrates the revenue accounting data set which will permit automatic accounting functions.
Figure 3:
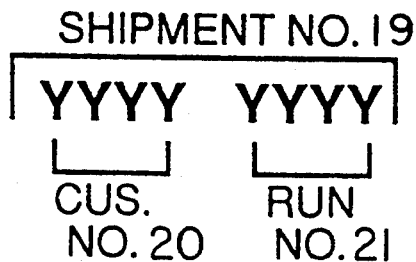
FIG. 3 illustrates the customer shipment number forming part of the revenue accounting data set.

The application by a customer of the PODI represents level 2 service. Level 3 service is achieved by the customer augmenting the PODI. More particularly, referring now to FIG. 2, this shows a revenue accounting data set 18 applied by a customer to a piece of mail. This includes the PODI 1 of FIG. 1 followed by an eight character customer shipment number 19 which is created by the customer and is unique. As shown more clearly in FIG. 3 the shipment number comprises a four character customer number 20 followed by a four character run number 21.

When mail pieces bearing the revenue accounting data set 18 pass through the system of FIG. 5 the bar code scanner 11 reads the coded data and causes a computer to compute and store information such as the total number of pieces in a particular shipment, the sortation performance results and the cost based on both the number of pieces and the sortation performance. The data stored in the computer can be checked against the manifest or mailing list which accompanies a batch of mail and discrepancies in the number of pieces, for example, can be determined and the bill generated.

Figure 4:
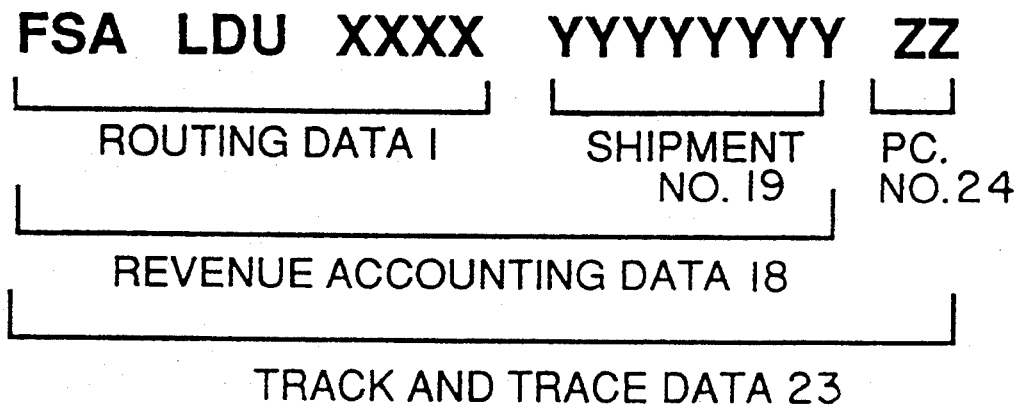
FIG. 4 illustrates the track and trace data set which will permit the automated monitoring of individual pieces of mail.

If the customer wishes to choose the level 4 track and trace feature he applies the track and trace data set 23 of FIG. 4 which comprises the revenue accounting data set 18 followed by a two character mail piece number 24. In other words, he simply adds the two character number 24 to the level 3 data set.

It should be apparent that the revenue accounting data set 18 also allows tracking and tracing because of the combination of routing data and shipment number, except in the case when two or more items in a shipment have the same routing data. The mail piece number 24 differentiates between the various items having the same routing data and provides a unique way of tracking or tracing an item.

At every machine which reads the code the information is recorded in the computer data base. Final scan by the mailman at the point of delivery may be used to cancel the tracking.

Referring now to FIG. 10, this shows a special services data set 28 which a customer can apply to a business reply envelope. The data set comprises the customer's shipment number 29 plus a two character instruction code 30 plus a ten character user defined data field 31.

It is noted that there is no routing data set such as a PODI. This is because all the mail pieces within the return shipment have the same routing data and so it is sufficient that the shipment number be known. (The shipment number would be submitted in advance by the customer to the Post office for authorization of processing.)

The two character code 30 is used as an instruction as to how the user defined field 31 is to be interpreted. For example, the instruction code may state that the data in field 31 is the respondent's coded address as in the case illustrated or may state that the data in field 31 indicates a particular type of response and so on. The important point is that the use of the shipment number permits the automatic processing and billing of any customer defined activity. The entire data set can be held for return mail collection, tracking and sortation data information.

The encoding of the point of delivery identifier will now be described in more detail.

The structure of the PODI is a ten character alphanumeric field. The first six characters are the point of delivery's postal code and the last four characters are determined based on the structure of standard addresses and the assignment of postal codes to addresses. These last four characters were referred to earlier as a stop identifier suffix. The dependence on knowing what type of addresses are associated with a particular postal code is important because it has been determined that this is the correct way of postal coding (as opposed to coding by type of user, or type of delivery receptacle, or type of delivery mode . . . ). The decision to associate a postal code to a set of addresses is usually taken at the time of postal coding assignment and the existing rules used for postal coding will ensure that this characteristic is not violated by association to other addresses. In this manner the person making the assignment decision would make a conscious decision to constrain the service level for those addresses because the restrictions on identifying points of call for the different proposed postal code/addresses relationships are clearly established in accordance with the rules.

There are seven proposed postal code/address relationships—the relationships are described with respect to a single postal code:

| | |
|---|---|
| UNIQUE | single civic address |
| BUILDING | civic addresses (or ranges) with common civic number |
| BLOCK FACE | civic addresses (or ranges) on one side of one street (between intersections) |
| BLOCK | civic addresses (or ranges) on both sides of one street (between intersections) |
| AREA | multiple civic addresses (or ranges) |
| STATION | all postal installation addresses excluding lock box addresses |
| LOCK BOX | lock box addresses |

The last four characters of the PODI are determined based on the type of the postal code. This implies that the correct postal code for a given address has been determined before a PODI can be determined, and of course if an incorrect (but existing) postal code is accepted, then an incorrect and possibly non-existent PODI will be generated.

In some instances there may be many streets served by the same postal code (e.g. AREA type) where the civic numbers are common for at least two of the streets. In these cases a street identifier is generated by writing the address street elements (street name, type, direction) and the municipality in the standard field format (less trailing blanks), each element is concatenated into one string separated by one blank (where appropriate) and then the ASCII values for each letter in the string are summed, then the result is transformed in modulus 36. The street identifier is the base 36 equivalent to the result.

| | |
|---|---|
| e.g. KING ST E TORONTO | == 75 + 73 + 78 + 71 + 32 + 83 + 84 + 32 + 69 + 32 + 84 + 79 + 82 + 79 + 78 + 84 + 79 = 1194% 36 = 24 → '6' |

UNIQUE or AREA Postal Code PODI

Last four characters are determined using one character for street id, two characters for the civic number converted to base 36, and the last character for the civic number suffix.

| | |
|---|---|
| e.g. 123456A MAIN ST E APT 12345 TORONTO ON FSA LDU | |
| street id: | '6' |
| civic number: | 123456 → '2N9C' → '9C' |
| civic number suffix: | 'A' |
| PODI: | FSALDU69CA |

BUILDING Postal Code PODI

Last four characters are determined using suite number.

| | |
|---|---|
| e.g. 123456A MAIN ST E APT 12345 TORONTO ON FSA LDU | |
| suite number: | 12345 → '2345' |
| PODI: | FSALDU2345 |

BLOCK FACE or BLOCK Postal Code PODI

Last four characters are determined using three characters for the civic number converted to base 36 and the last character for the civic number suffix.

| | |
|---|---|
| e.g. 123456A MAIN ST 3 APT 12345 TORONTO ON FSA LDU | |
| civic number: | 123456 → '2n9c' → 'N9C' |
| civic number suffix: | 'A' |
| PODI: | FSALDUN9CA |

STATION Postal Code PODI

Last four characters are determined using one character to represent the delivery mode and the last three characters for the delivery mode identifier.

| | |
|---|---|
| e.g. RR 1 PERTH ON FSA LDU | |
| delivery mode: | RR → 'R' |

-continued

| | |
|---|---|
| delivery mode id: | → '001' |
| PODI: | FSALDUR001 |
| e.g. GD PERTH ON FSA LDU | |
| delivery mode: | GD → 'G' |
| delivery mode id: | → '000' |
| PODI: | FSALDUG000 |

LOCK BOX Postal Code PODI

Last four characters are determined using lock box number.

| | |
|---|---|
| e.g. PO BOX 123 PERTH ON FSA LDU | |
| lock box number: | 123 → '0123' |
| PODI: | FSALDU0123 |

Point of Delivery Identifier (PODI) Resolution

Inferred in the above definition of the PODI for the seven types of postal code/address relationships is the following resolution of the identified points of call. Note that this resolution does not mean that the information is embedded in the PODI.

| | |
|---|---|
| UNIQUE | individual civic address and suite |
| BUILDING | individual suite |
| BLOCK FACE | individual civic address with unique civic number and civic number suffix (no suites) |
| BLOCK | individual civic address with unique civic number and civic number suffix (no suites) |
| AREA | individual civic address with unique civic number and civic number suffix (no suites) |
| STATION | distinct delivery mode |
| LOCK BOX | individual lock box |

PODI Algorithm Implementation

Figure 11:
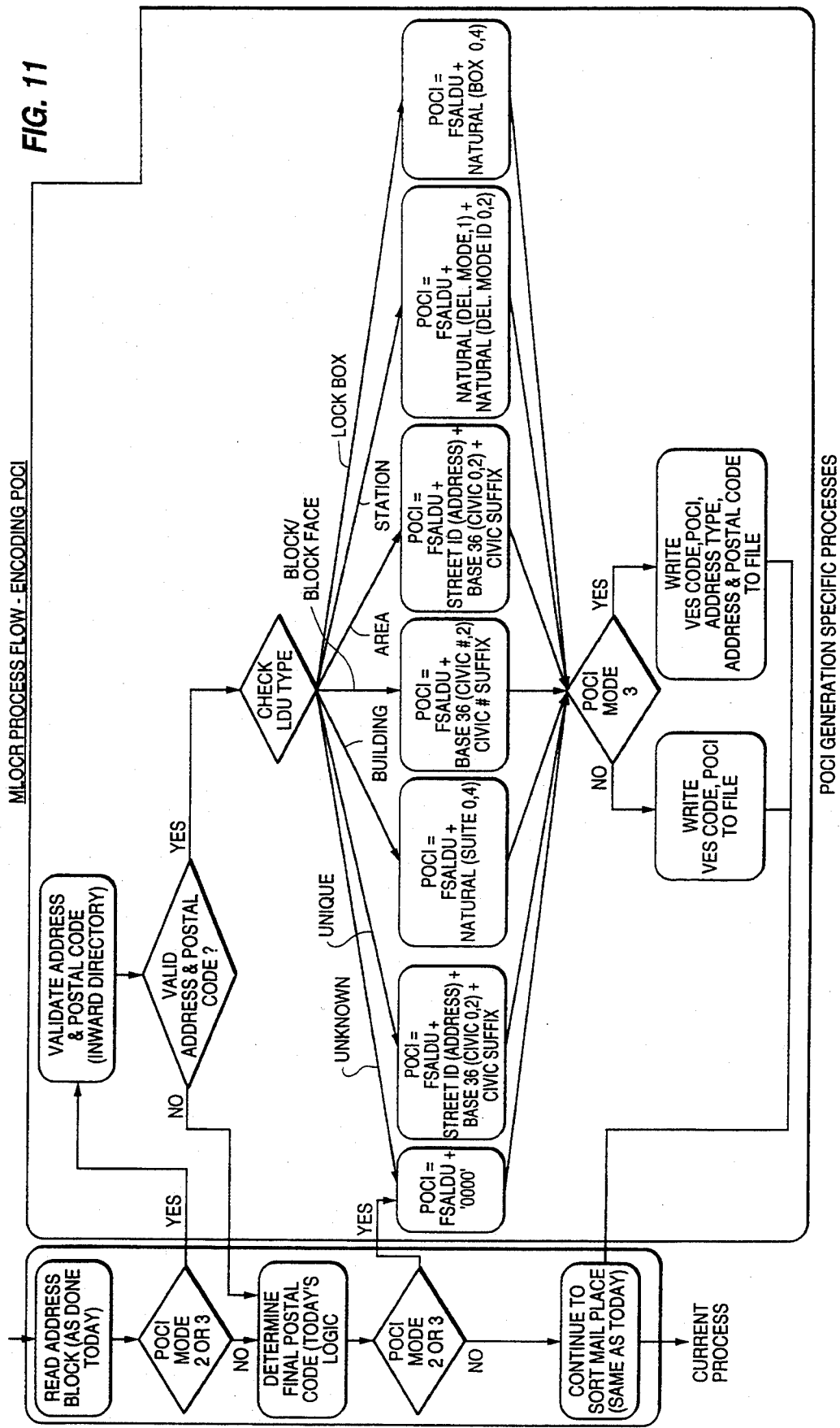
FIG. 11 is a flow chart illustrating the encoding of the PODI.
Figure 12:
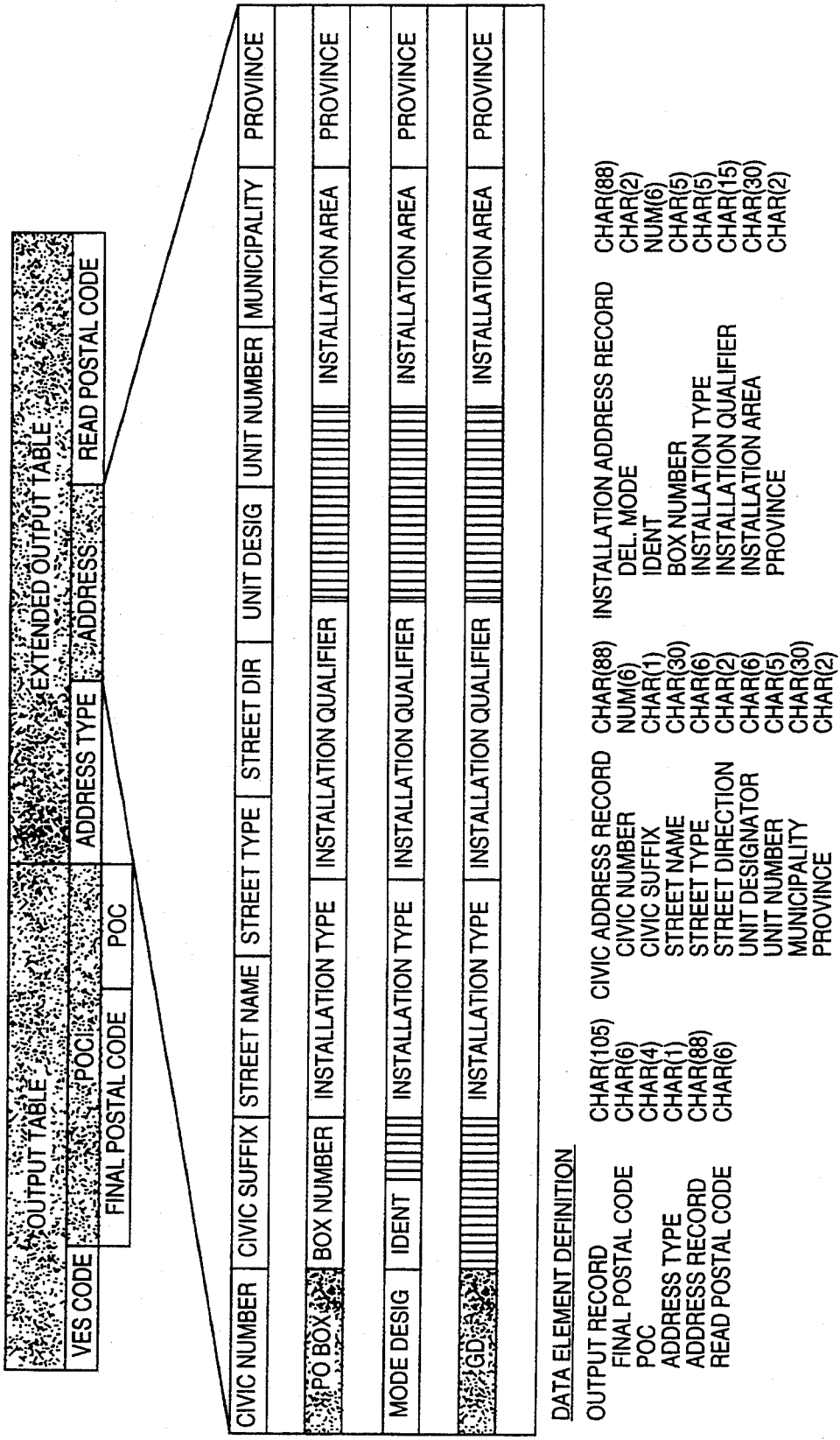
FIG. 12 is an address table for the PODI.

FIGS. 11a and 11b form a flow chart of the algorithm as it could be implemented in today's MLOCR systems. The extra data requirements for directory generation are expressed in FIG. 12 as extensions to the current Post Office Address Lookup File and the output file structure is described for 3 types of modes—PODI Algorithm Off, PODI Algorithm On with Normal Output Table, and PODI Algorithm On with Debug/Test Output Table.

For each mail piece:
Read address block
If PODI mode=2 or 3
  Validate address and postal code in the inward directory
  If address and postal code are valid then generate the PODI by:
    Check address type in directory
    If address type=UNIQUE then
      Read street id from directory
      Convert civic number to base 36 and truncate to 2 characters, padding on left with leading zeros as necessary
      Combine street id, 2 character civic number field and civic number suffix ('0' if none) and append to postal code
    Else if address type=BUILDING
      Truncate suite number to 4 characters, padding on left with leading zeros as necessary Append truncated suite number to postal code
    Else if address type=BLOCK or BLOCK FACE
      Convert civic number to base 36 and truncate to 3 characters, padding on left with leading zeros as necessary
      Combine 3 character civic number field and civic number suffix ('0' if none) and append to postal code
    Else if address type=AREA
      Read street id from directory
      Convert civic number to base 36 and truncate to 2 characters, padding with leading zeros as necessary
      Combine street id, truncated civic number field and civic number suffix ('0' if none) and append to postal code
    Else if address type=STATION
      Extract 1 character of delivery mode from address (e.g. R for RR, M for MS . . . )
      Truncate delivery mode identifier to 3 digits, padding on left with leading zeros as necessary
      Combine delivery mode character and truncated delivery mode identifier and append to postal code
    Else if address type=LOCK BOX
      Truncate lock box number to 4 characters, padding on left with leading zeros as necessary
      Append truncated lock box number to postal code
    Else (address style=UNKNOWN)
      Append '0000' to postal code
  Else (this is where the mail piece would be rejected to VES in the production system)
    Determine final postal code according to current logic
    Append '0000' to final postal code
  Endif
  If PODI mode=2
    Write VES code and PODI to output table
  Else (PODI mode=3)
    Write VES code, PODI, address type, read address, and read postal code to output file
  Endif
Continue to sort mail piece

Input Address File Modified format

The record structure for the CPC address tape will be modified slightly to accommodate this test implementation—the record length will be augmented by 2 bytes to accommodate two new fields:
Address Type Field—numeric 1 digit field where
  0=UNKNOWN
  1=UNIQUE
  2=BUILDING
  3=BLOCK FACE
  4=BLOCK
  5=AREA
  6=STATION
  7=LOCK BOX
Street ID Field—alpha-numeric 1 character field (filled only for address types UNIQUE and AREA)

Output Table for VES Code/PODI/Address

The VES/PODI/Address information is to be stored a table on the MLOCR according to the attached record definition. In mode 2 (On with Normal Output) the Extended Output part of the record should be left blank. This table is to be integrated with the existing cell controller system.

What we claim is:

1. Apparatus for automatically sorting mail comprising optical character reader means, means for receiving pieces of mail and feeding them to the optical character reader means, the optical character reader means being arranged to read a delivery address including a postal code corresponding to the delivery address on each piece of mail and generate an output and computer means receiving the output from the optical character reader means and generating a stop identifier suffix based on the address and postal code only whereby the postal code and the stop identifier suffix together form a point of delivery identifier which uniquely identifies a final delivery address.

2. Apparatus according to claim 1, including means for printing the stop identifier suffix on the corresponding piece of mail.

3. Apparatus according to claim 2, in which the stop identifier suffix is printed as a bar code.

4. Apparatus according to claim 3, in which the computer means is arranged to generate a bar code identifying the postal code and the printing means is also arranged to print on the corresponding piece of mail the bar code identifying the postal code as well as the stop identifier suffix.

5. Apparatus according to claim 4, including bar code scanner means for reading the bar codes and means for sorting the pieces of mail in sequence.

6. A method of encoding and decoding mail pieces, at least some of which contain return mail items, the method comprising determining from an address list a stop identifier suffix for a delivery address on the mail piece, said stop identifier suffix combined with a postal code corresponding to the delivery address forming a routing data set uniquely identifying a final delivery address, the customer applying to a designated area of each piece of mail a machine readable code comprising a specific routing data set representing routing information, an optional shipment number forming with the routing data set a revenue accounting data set, and an optional piece number forming with the revenue accounting data set a track and trace data set, the customer also applying to a designated area of the return mail items a machine readable code comprising the shipment number followed by an instruction code and a user defined field, decoding in the Post Office the mail pieces by an optical character reader each data set and automatically sorting the mail according to the routing data set, automatically computing account information based on the revenue account data set and automatically tracking the mail pieces based on the track and trace data set and when the return mail items are returned in the mail, decoding in the Post Office by an optical character reader the machine readable code on the return mail items and automatically computing account information.

* * * * *

UNITED STATES PATENT AND TRADEMARK OFFICE
CERTIFICATE OF CORRECTION

PATENT NO. : 5,420,403
DATED : May 30, 1995
INVENTOR(S) : David R. Allum et al.

It is certified that error appears in the above-indentified patent and that said Letters Patent is hereby corrected as shown below:

At item [75] of the cover page, before "all of Canada", insert

--Yukee Yeung, Baie D'Urfe,--.

Signed and Sealed this

Fourteenth Day of November, 1995

Attest:

BRUCE LEHMAN

Attesting Officer

Commissioner of Patents and Trademarks